(12) United States Patent
Nakawatase et al.

(10) Patent No.: US 8,267,070 B2
(45) Date of Patent: Sep. 18, 2012

(54) INTAKE MIXTURE INTRODUCING APPARATUS

(75) Inventors: Akira Nakawatase, Toyota (JP); Taketo Nagasaki, Aichi-ken (JP); Junji Watanabe, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 230 days.

(21) Appl. No.: 12/744,946

(22) PCT Filed: Nov. 28, 2008

(86) PCT No.: PCT/IB2008/003264
§ 371 (c)(1),
(2), (4) Date: Jun. 25, 2010

(87) PCT Pub. No.: WO2009/068976
PCT Pub. Date: Jun. 4, 2009

(65) Prior Publication Data
US 2012/0090578 A1   Apr. 19, 2012

(30) Foreign Application Priority Data

Nov. 30, 2007  (JP) ................................. 2007-310467

(51) Int. Cl.
*F02B 47/08* (2006.01)
*F02B 47/10* (2006.01)
(52) U.S. Cl. .................................. 123/568.15; 701/108
(58) Field of Classification Search ............. 123/568.11, 123/568.17, 568.15, 542, 590, 184.53; 701/108; 60/605.1, 605.2, 278, 280, 298
See application file for complete search history.

(56) References Cited

U.S. PATENT DOCUMENTS

| 6,502,397 | B1 * | 1/2003 | Lundqvist | ................... 60/605.2 |
| 2009/0173306 | A1 * | 7/2009 | Matsudaira | ............. 123/184.53 |

FOREIGN PATENT DOCUMENTS

| DE | 197 57 986 A1 | 7/1999 |
| GB | 2 173 857 A | 10/1986 |
| JP | 60-090973 A | 5/1985 |
| JP | 63-177653 U | 11/1988 |
| JP | 2-211369 A | 8/1990 |
| JP | 04-044462 U | 4/1992 |
| JP | 05-312112 A | 11/1993 |
| JP | 06-081721 A | 3/1994 |
| JP | 08-144868 A | 6/1996 |
| JP | 2000-192862 A | 7/2000 |
| JP | 2003-106785 A | 4/2003 |
| JP | 2005-163684 A | 6/2005 |
| JP | 2006-052712 A | 2/2006 |
| JP | 2006-118425 A | 5/2006 |

* cited by examiner

*Primary Examiner* — Mahmoud Gimie
(74) *Attorney, Agent, or Firm* — Sughrue Mion, PLLC

(57) ABSTRACT

High pressure regions (31H to 35H) and low pressure regions (31L to 34L) are created based on the exhaust gas flow at curves in an EGR pipe (30), thereby enabling the exhaust gas pressure at inlets (21*b* to 26*b*) of gas introduction passages (21*a* to 26*a*) to be adjusted. Accordingly, regardless of the number of cylinders or whether the lengths of the flow paths of the EGR pipe (30) are the same, the exhaust pressure at the inlets (21*b* to 26*b*) of the gas introduction passages (21*a* to 26*a*) can be appropriately adjusted so any difference in pressure of exhaust gas introduced into branch pipes (21 to 26) can be reduced. In this way, the EGR rates of the cylinders can be made closer or the same such that stable combustion can be achieved, thus enabling stable engine operation to be maintained. The EGR pipe (30) is arranged weaving closely between the branch pipes (21 to 26) so space efficiency can be improved and a sufficient amount of exhaust gas can be introduced evenly into the cylinders.

11 Claims, 5 Drawing Sheets

INTAKE MIXTURE INTRODUCING APPARATUS

BACKGROUND OF THE INVENTION

1. Field of the Invention

The invention relates to an intake mixture introducing apparatus which introduces gas from a common gas passage into intake air paths independently provided for each cylinder of an internal combustion engine having a plurality of cylinders, via gas introduction passages independently provided for each of the intake air paths.

2. Description of the Related Art

Exhaust gas recirculation (hereinafter simply referred to as "EGR") is known technology for reducing oxides of nitrogen in exhaust gas of an internal combustion engine. One type of EGR is external EGR in which exhaust gas discharged from a combustion chamber is supplied to an intake system via an EGR passage (see Japanese Patent Application Publication No. 2-211369 (JP-A-2-211369) and Japanese Utility Model Application Publication No. 63-177653 (JP-U-63-177653), for example).

When performing EGR in an internal combustion engine having a plurality of cylinders, the exhaust gas concentration, i.e., the so-called EGR rate, in the intake air supplied to each combustion chamber must be adjusted so that it is the same for each cylinder in order to obtain the same combustion state in each combustion chamber. To accomplish this, the technology described in JP-A-2-211369 adjusts the amount of introduced exhaust gas so that it is the same for each cylinder by making the lengths of the flow paths from the EGR passage to the intake passage of each cylinder the same. On the other hand, the technology described in JP-U-63-177653 adjusts the amount of introduced exhaust gas so that it is the same for each cylinder by adjusting the sectional area of a distribution passage and a communicating passage according to the difference in length of the exhaust gas introduction path.

However, the lengths of the flow paths from the EGR passage to the intake passage of each cylinder may not always be able to be made the same, as they are with the structure described in JP-A-2-211369, due to limitations in the internal combustion engine. Also, the technology described in JP-U-63-177653 is limited to an internal combustion engine with four cylinders and is unable to be applied to internal combustion engine with any other number of cylinders.

SUMMARY OF THE INVENTION

This invention thus provides an intake mixture introducing apparatus capable of adjusting the amount of gas introduced into intake air regardless of the number of cylinders or whether the lengths of the flow paths are the same or different.

One aspect of the invention relates to an intake mixture introducing apparatus that introduces gas from a common gas passage into intake paths independently provided for each cylinder of an internal combustion engine provided with a plurality of cylinders, via gas introduction passages independently provided for each intake path. The intake mixture introducing apparatus has a gas pressure adjusting mechanism that adjusts the pressure of gas introduced into the intake paths via the gas introduction passages provided in the gas passage corresponding to the positions where the gas introduction passages are arranged.

This kind of gas pressure adjusting mechanism that adjusts the gas pressure is provided in the gas passage corresponding to the positions where the gas introduction passages are arranged. As a result, the pressure of the gas that is introduced into the intake path can be appropriately adjusted, such that the amount of gas introduced into the intake air can be adjusted, regardless of the number of cylinders or whether the lengths of the flow paths are the same or different.

Using this, the pressures of the gas introduced into the intake paths can be adjusted so that they are close or even the same, so intake air in which there is only a small difference, or no difference at all, in the gas concentration can be supplied to the combustion chambers.

Also, the gas pressure adjusting mechanism may be provided for one or two or more of the gas introduction passages, and adjust the pressure of the gas introduced into the intake paths such that a difference in the pressure of the gas introduced into the intake paths is reduced.

Accordingly, the amount of gas introduced into the intake air can be adjusted regardless of the number of cylinders or whether the lengths of the flow paths are the same or different. As a result, intake air in which there is only a small difference, or no difference at all, in the gas concentration can be supplied to the combustion chambers.

Further, the gas pressure adjusting mechanism may adjust the pressure of the gas introduced into the intake paths by causing a change in the gas pressure at inlets of the gas introduction passages using gas flow inside the gas passage.

In this way, a gas pressure adjusting mechanism is provided which causes a change in the gas pressure at the inlets of the gas introduction passages using the gas flow so the gas pressure at the inlets of the gas introduction passages can be appropriately adjusted regardless of the number of cylinders or whether the lengths of the flow paths are the same or different. Therefore, the gas pressures at the inlets of the gas introduction passages can be made close or the same such that the amount of gas that is introduced is made close or the same. As a result, intake air in which there is only a small difference, or no difference at all, in the gas concentration can be supplied to the cylinders.

Also, the gas pressure adjusting mechanism may provide a curve in the gas passage and adjust the gas pressure at the inlets using a pressure changing effect of the curve on the gas flow.

When there is a curve in the gas passage, a high-low imbalance is created in the gas pressure in the radial direction with the gas flow near that curve. Moreover, a high-low imbalance is also created in the flow direction, i.e., the axial direction. Arranging the inlets of the gas introduction passages by selecting positions with the desired pressure using the pressure distribution generated with this gas flow enables the amount of gas introduced into the intake air to be adjusted regardless of the number of cylinders or whether the lengths of the flow paths are the same or different.

Also, the gas pressure adjusting mechanism may provide the curve by forming the gas passage in a serpentine shape.

Further, the gas pressure adjusting mechanism may provide one or both of a concave portion and a convex portion on an inside surface of the gas passage, and adjust the gas pressure at the inlets using a pressure changing effect of one or both of the concave portion and the convex portion on the gas flow.

When there are is a concave portion and a convex portion on the inside surface of the gas passage, the gas flow comes off of and is constricted by the inside surface as the gas flows near the concave portion and the convex portion, which causes the high-low imbalance in the gas pressure in the radial and axial directions. Arranging the inlets of the gas introduction passages by selecting positions with the desired pressure using the pressure distribution generated with this gas flow enables the amount of gas introduced into the intake air to be adjusted regardless of the number of cylinders or whether the lengths of the flow paths are the same or different.

Moreover, a plurality of the gas pressure adjusting mechanisms which adjust the gas pressure to different levels may be arranged in the direction of gas flow in the gas passage so as to adjust the gas pressure at the inlets.

The average gas pressure differs in the direction of gas flow in the gas passage according to the location due to flow resistance. Therefore, arranging a plurality of gas pressure adjusting mechanisms which adjust the gas pressure to different levels enables the gas pressure at the plurality of inlets of the gas introduction passages to be adjusted sequentially in the direction of gas flow. Accordingly, the pressures of gas introduced into the plurality of intake paths can be appropriately adjusted, which enables the amount of gas introduced into the intake air in the combustion chambers to be adjusted, regardless of the number of cylinders or whether the lengths of the flow paths are the same or different.

Using this, the pressures of the gas introduced into the intake paths which differ depending on the positions in the direction of gas flow inside the gas passage can be adjusted so that they are close or even the same, so intake air in which there is only a small difference, or no difference at all, in the gas concentration can be supplied to the combustion chambers.

Also, the gas pressure adjusting mechanisms may be arranged so as to reduce the pressure farther upstream of the gas introduction passages and increase the pressure farther downstream of the gas introduction passages.

Providing a plurality of gas pressure adjusting mechanisms arranged in this way enables the gas pressures at the inlets of the gas introduction passages to be made close or even the same, so intake air in which there is only a small difference, or no difference at all, in the gas concentration can be supplied to the cylinders.

Also, the gas passage may be an EGR passage. Having the gas passage be an EGR passage in this way enables the exhaust gas pressure at the inlets of the gas introduction passages to be adjusted regardless of the number of cylinders or whether the lengths of the flow paths are the same or different. Therefore, the exhaust gas pressure at the inlets of the gas introduction passages can be made closer or the same, such that intake air in which there is only a small difference, or no difference at all, in the exhaust gas concentration can be supplied to the cylinders.

Further, the gas pressure adjusting mechanism may be set to bring EGR rates in the cylinders closer together. In this way, the EGR rates among the cylinders can be made close, regardless of the number of cylinders or whether the lengths of the flow paths are the same or different, such that stable combustion can be achieved.

Moreover, the gas pressure adjusting mechanism may be set to make EGR rates in the cylinders the same. In this way, the EGR rates among the cylinders can be made the same, regardless of the number of cylinders or whether the lengths of the flow paths are the same or different, such that sufficiently stable combustion can be achieved.

Also, an intake pressure adjusting mechanism that adjusts an intake pressure at outlets of the gas introduction passages may be provided in the intake paths.

Providing an intake pressure adjusting mechanism in addition to the gas pressure adjusting mechanism in this way enables an amount of introduced gas that also takes into account the pressure on the intake air side to be adjusted regardless of the number of cylinders or whether the lengths of the flow paths are the same or different. Therefore, the amount of gas that is introduced can be more precisely adjusted with a high degree of freedom.

Also, the intake pressure adjusting mechanism may cause a change in the intake pressure at the outlets of the gas introduction passages using intake air flow in the intake paths.

Similar to the gas passage side, the intake pressure at the outlets of the gas introduction passages can also be changed using the intake air flow in the intake paths. As a result, the intake pressure at the outlets of the gas introduction passages can be changed without changing the overall pressure of intake air that is introduced into the cylinders.

Furthermore, the gas pressure adjusting mechanism and the intake pressure adjusting mechanism may work together to adjust the amount of gas introduced into the intake paths from the gas passage via the gas introduction passages.

Using the gas pressure adjusting mechanism and the intake pressure adjust mechanism together in this way makes it possible to more precisely adjust with a high degree of freedom the amount of gas that is introduced regardless of the number of cylinders or whether the lengths of the flow paths are the same or different. Also, the gas pressure adjusting mechanism and the intake pressure adjusting mechanism may work together to reduce the difference in gas concentration in the cylinders.

Reducing the difference in the gas concentrations in the cylinders by using the gas pressure adjusting mechanism and the intake pressure adjust mechanism together in this way enables an even gas concentration among the cylinders to be obtained with greater precision and a high degree of freedom.

Furthermore, the gas pressure adjusting mechanism and the intake pressure adjusting mechanism may work together to make the gas concentration in the cylinders the same.

Making the gas concentrations in the cylinders the same by using the gas pressure adjusting mechanism and the intake pressure adjust mechanism together in this way enables the same gas concentration to be obtained with greater precision and a high degree of freedom in all of the cylinders.

BRIEF DESCRIPTION OF THE DRAWINGS

The foregoing and further objects, features and advantages of the invention will become apparent from the following description of example embodiments with reference to the accompanying drawings, wherein like numerals are used to represent like elements, and wherein.

DETAILED DESCRIPTION OF THE EMBODIMENTS

Figure 1:
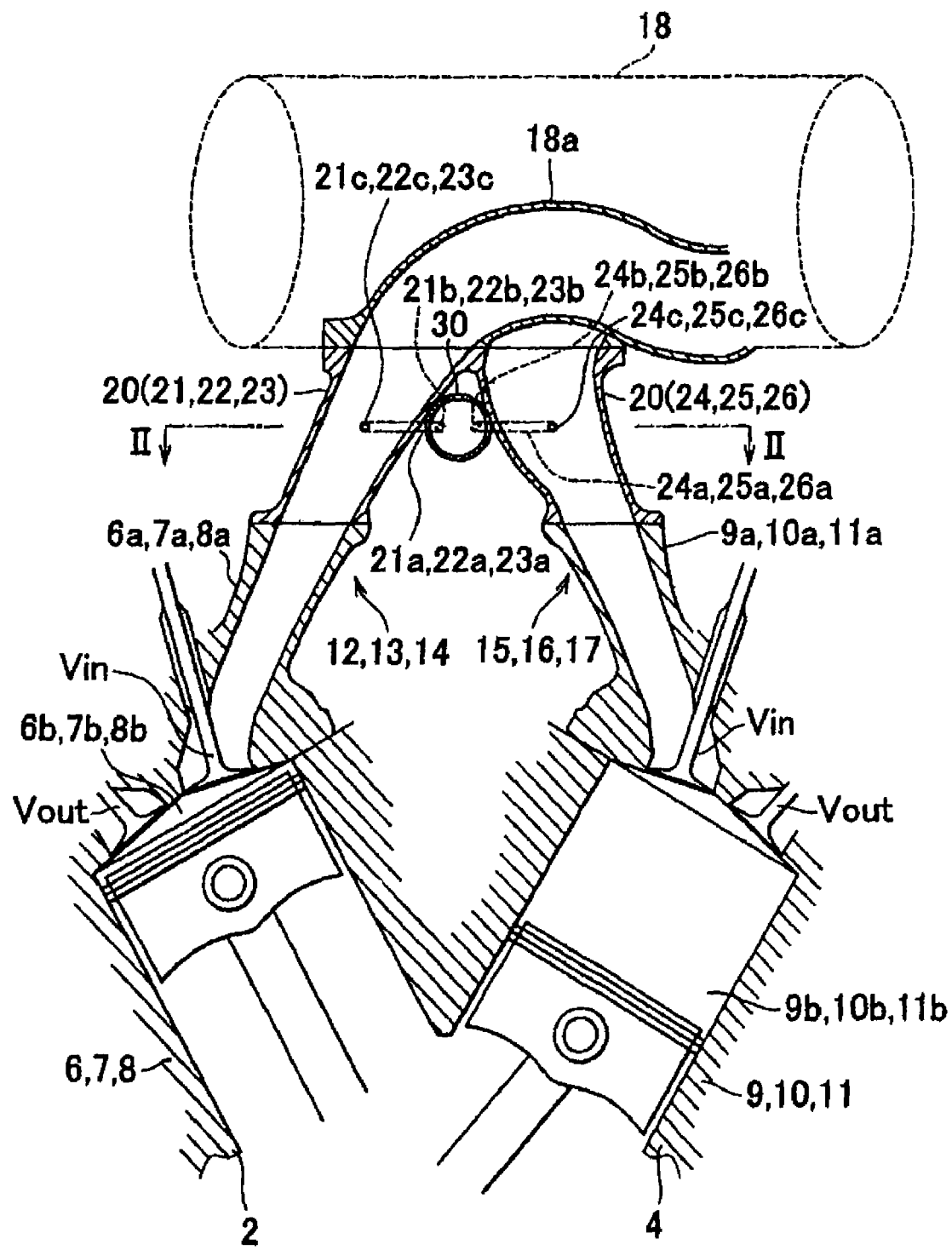
FIG. 1 is a longitudinal sectional view showing the general structure of an intake mixture introducing apparatus according to a first example embodiment of the invention.
Figure 2:
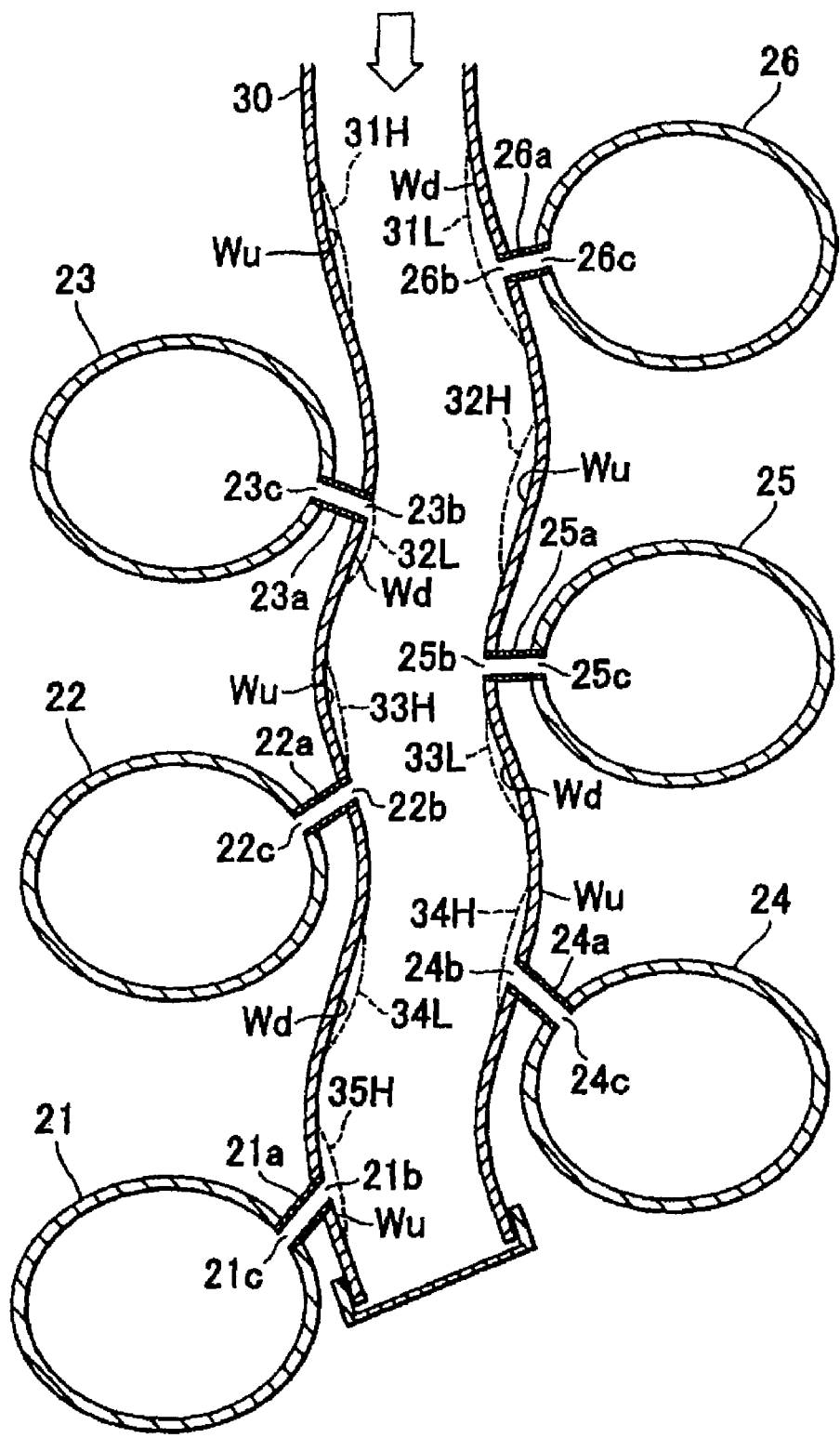
FIG. 2 is a horizontal sectional view taken along line II-II in FIG. 1.

FIG. 1 is a longitudinal sectional view showing the general structure of an intake mixture introducing apparatus in a V-type six cylinder internal combustion engine according to a first example embodiment of the invention. More specifically, FIG. 1 is a longitudinal sectional view of cylinders 6 to 11 of a left bank 2 and a right bank 4, and intake paths 12 to 17 that supply intake air to these cylinders 6 to 11. FIG. 2 is a horizontal sectional view taken along line II-II in FIG. 1.

The intake paths 12 to 17 that supply intake air to the cylinders 6 to 11 include a branch path 18a formed integrally with a surge tank 18, an intake manifold 20 that is connected to the surge tank 18, and intake ports 6a to 11a that are connected to this intake manifold 20. Intake air drawn into the surge tank 18 from outside is distributed to the intake manifold 20 via the branch path 18a, and then supplied to combustion chambers 6b to 8b of the three cylinders 6 to 8 of the left bank 2 and combustion chambers 9b to 11b of the three cylinders 9 to 11 of the right bank 4 via intake valves Vin from the intake ports 6a to 11a.

The intake manifold 20 is formed of three branch pipes (so-called runners) 21 to 23 on the left bank 2 side and three branch pipes (so-called runners) 24 to 26 on the right bank 4 side. An EGR pipe 30 (which corresponds to a gas passage) is arranged snaking closely between the arrangement of the three branch pipes 21 to 23 of the left bank 2 and the arrangement of the three branch pipes 24 to 26 of the right bank 4. On the whole, the EGR pipe 30 is arranged extending in the direction in which the branch pipes 21 to 26 are arranged, and orthogonal to the axes of the branch pipes 21 to 26. Exhaust gas discharged from the combustion chambers 6b to 11b through exhaust valves Vout is recirculated to this EGR pipe 30 as EGR gas through an EGR valve, the opening amount of which is adjusted according to the operating state of the internal combustion engine.

The EGR pipe 30 and the six branch pipes 21 to 26 are communicatively connected together by gas introduction passages 21a to 26a independently provided for each branch pipe 21 to 26. The exhaust gas that flows through the EGR pipe flows into the gas introduction passages 21a to 26a through inlets 21b to 26b and is discharged through outlets 21c to 26c into the intake air that flows through the six branch pipes 21 to 26. As a result, intake air with exhaust gas mixed in is introduced into the combustion chambers 6b to 11b.

In this case, the EGR pipe 30 is serpentine shaped so the EGR pipe 30 can have a sufficiently large diameter even when it is arranged in the relatively narrow space in between the branch pipes 21 to 23 of the left bank 2 and the branch pipes 24 to 26 of the right bank 4. Incidentally, in FIG. 1, the EGR pipe 30 has a circular cross-section, but it may also have a triangular or trapezoidal cross-section in order to more effectively utilize the narrow space between the branch pipes 21 to 26.

With the EGR pipe 30, exhaust gas is introduced into the branch pipes 21 to 26 via the gas introduction passages 21a to 26a that are arranged from upstream to downstream. In the EGR pipe 30, the exhaust pressure is greatest farthest upstream and lowest farthest downstream due to exhaust gas flow resistance. Therefore, normally the amount of exhaust gas that is introduced from the gas introduction passages 23a, 25a, 22a, 24a, and 21a into the cylinders 8, 10, 7, 9, and 6 decreases farther downstream compared with the cylinder 11 that receives intake air from the branch pipe 26 into which exhaust gas is introduced from the gas introduction passage 26a farthest upstream. Accordingly, the combustion state changes sequentially, and is therefore not the same, in the cylinders 11, 8, 10, 7, 9, and 6.

However, in the first example embodiment, exhaust gas can be introduced into the branch pipes 21 to 26 at substantially the same pressure as a result of the curves of the serpentine shaped EGR pipe 30. That is, as shown in FIG. 2, the curves create high pressure regions 31H to 35H at the wall surfaces Wu that curve toward the exhaust flow. The exhaust pressure is greater in these high pressure regions 31H to 35 than it is in the surrounding areas due to the exhaust flow colliding with the wall surface Wu. Conversely, low pressure regions 31L to 35L are created at the wall surfaces Wd that curve away from the exhaust flow. The exhaust pressure is lower in these low pressure regions 31L to 35L than it is in the surrounding areas due to the exhaust flow coming off of the wall surfaces Wu.

Therefore, the inlet 26b of the gas introduction passage 26a farthest upstream is provided in a position where the pressure is the lowest in the low pressure region 31L. The inlet 23b of the gas introduction passage 23a that is second farthest upstream is provided in a position where the pressure is low but not the lowest in the low pressure region 32L. The inlet 25b of the gas introduction passage 25a that is third farthest upstream is provided in a position that is neither in the high pressure region 32H nor the low pressure region 33L. The inlet 22b of the gas introduction passage 22a that is fourth farthest upstream is provided in a position slightly overlapping the high pressure region 33H. The inlet 24b of the gas introduction passage 24a that is fifth farthest upstream is provided in a position where the pressure is high but not the highest in the high pressure region 34H. The inlet 21b of the gas introduction passage 21a farthest downstream is provided in a position where the pressure is the highest in the high pressure region 35H.

That is, in this first example embodiment, the serpentine shaped portion of the EGR pipe 30 serves as the gas pressure adjusting mechanism. The high pressure regions 31H to 35H and the low pressure regions 31L to 34L formed using the exhaust gas flow at these curves are applied to introducing exhaust gas into the gas introduction passages 21a to 24a and 26a, which adjusts the pressure of the exhaust gas introduced into the branch pipes 21 to 24 and 26. In this case, the pressures at the inlets 26b and 23b of the gas introduction passages 26a and 23a upstream of the inlet 25b of the gas introduction passage 25a which does not utilize either the high pressure region 32H or the low pressure region 33L are reduced, while the pressures at the inlets 22b, 24b, and 21b of the gas introduction passages 22a, 24a, and 21a downstream of the inlet 25b of the gas introduction passage 25a are increased.

In this way, the pressures of the exhaust gas at the inlets 21b to 24b and 26b of the other gas introduction passages 21a to 24a and 26a are closer to the pressure of the exhaust gas that is introduced from the inlet 25b of the gas introduction passage 25a which does not utilize either the high pressure region 32H or the low pressure region 33L. As a result, the difference in pressures of the exhaust gas introduced into the branch pipes 21 to 26 is reduced or eliminated altogether (i.e., the pressure becomes the same in all of the branch pipes 21 to 26). Accordingly, the difference in the EGR rates among the cylinders 6 to 11 is reduced or eliminated altogether.

In this first example embodiment, the inlet 25b of the gas introduction passage 25a does not use either the high pressure region 32H or the low pressure region 33L. Alternatively, however, it may use the high pressure region 32H or the low pressure region 33L. That is, the difference in the pressures of the exhaust gas may be reduced or eliminated altogether by adjusting the pressure of the exhaust gas introduced into the branch pipes 21 to 26 at all of the gas introduction passages 21a to 26a.

The first example embodiment described above yields the following effects. (I). In the first example embodiment, the curves created by the serpentine shape of the EGR pipe 30 form the gas pressure adjusting mechanism that uses the exhaust gas flow. The high pressure regions 31H to 35H and the low pressure regions 31L to 34L are created based on the exhaust gas flow at these curves. As a result, the exhaust pressure at the inlets 21b to 26b of the gas introduction passages 21a to 26a is able to be adjusted.

Accordingly, the exhaust pressure at the inlets 21b to 26b of the gas introduction passages 21a to 26a can be appropriately adjusted regardless of the number of cylinders or whether the lengths of the flow paths of the EGR pipe 30 are the same or different. Therefore, the difference in the pressure of the exhaust gas introduced into the branch pipes 21 to 26 can be reduced or eliminated altogether.

Accordingly, it is possible to supply intake air in which the difference in the exhaust gas concentration is reduced or eliminated to the combustion chambers 6b to 11b of the cylinders 6 to 11. This enables the EGR rates in the cylinders to be closer or the same, which results in more stable combustion so stable engine operation can be maintained.

(II). The EGR pipe 30 is arranged weaving in a serpentine pattern tightly in between the branch pipes 21 to 26. This improves the space efficiency and enables a sufficient amount of exhaust gas to be introduced evenly into the cylinders 6 to 11.

Figure 3A:
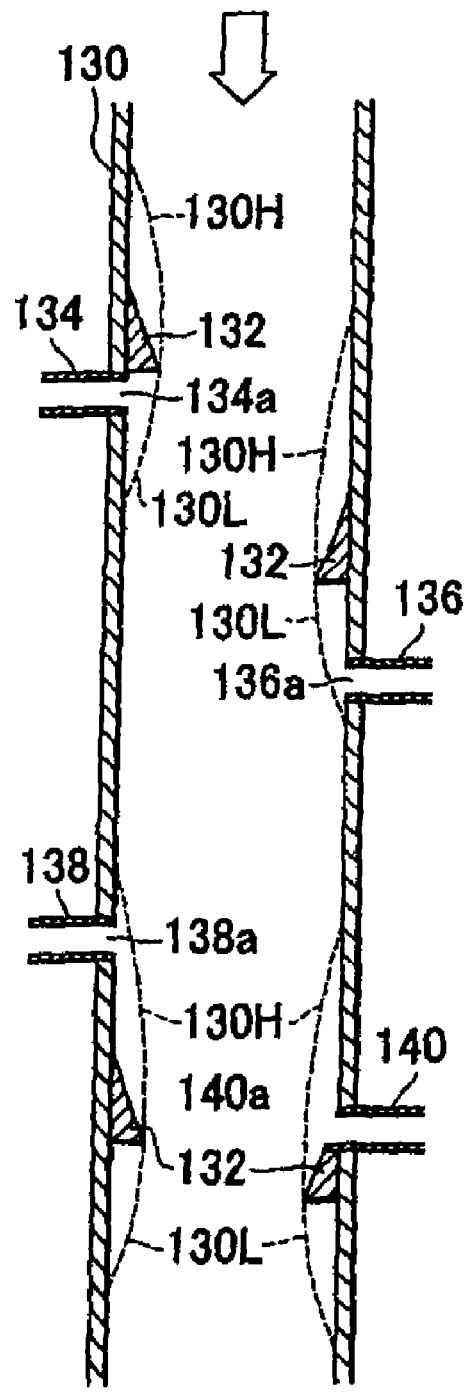
FIGS. 3A to 3C are diagrams showing the structures of a gas pressure adjusting mechanism in an intake mixture introducing apparatus according to a second example embodiment of the invention.

A gas pressure adjusting mechanism according to a second example embodiment of the invention will now be described. FIG. 3A shows an example in which an EGR pipe 130 is a straight pipe having protrusions 132 (which correspond to protruding portions) provided on the inside. High pressure regions 130H are created as a result of the exhaust gas flow being temporarily constricted from upstream of the protrusions 132 all the way up to where the protrusions 132 is positioned. Also, low pressure regions 130L are created as a result of the exhaust gas flow coming off of the inside surface of the EGR pipe 130 directly downstream of the protrusions 132. Using this design, inlets 134a and 136a of gas introduction passages 134 and 136 are arranged in the low pressure regions 130L on the upstream side, and inlets 138a and 140a of gas introduction passages 138 and 140 are arranged in the high pressure regions 130H on the downstream side.

In this way, even if the EGR pipe 130 is not a serpentine shape or curved, a gas pressure adjusting mechanism can still be realized, and the high pressure regions 130H and the low pressure regions 130L are created using the exhaust gas flow. As a result, the exhaust pressure at the inlets 134a to 140a of the gas introduction passages 134 to 140 can be appropriately adjusted so the same effects as those obtained in (I) in the first example embodiment described above can be obtained.

Figure 3B:
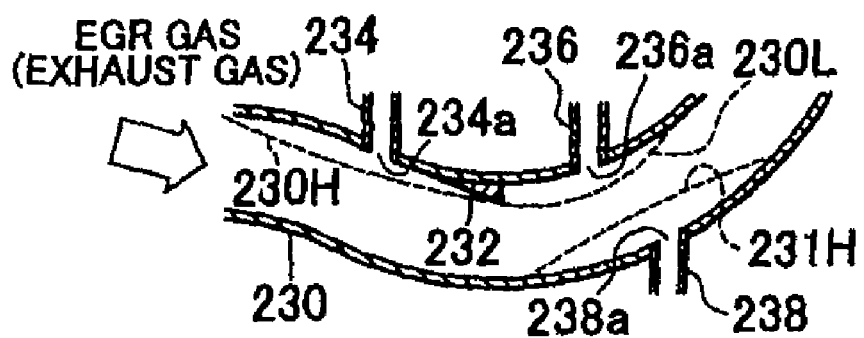

Protrusions 232 (which correspond to protruding portions) may also be used in an EGR pipe 230 that is curved like that in the first example embodiment, as shown in FIG. 3B. In FIG. 3B, the protrusions 232 are formed on the inside surface on the inside of the curve. As a result, the pressure at the high pressure regions 230H is higher and those high pressure regions 230H are enlarged upstream of the protrusions 232, while the pressure at the low pressure regions 230L is lower and those low pressure regions 230L are enlarged downstream of the protrusions 232. Moreover, by the influence of the protrusions 232, the pressure at the high pressure regions 231H on the inside surface of the side opposite the protrusions 232 is higher and those high pressure regions 231H are enlarged. Providing inlets 234a, 236a, and 238a of gas introduction passages 234, 236, and 238 in desired positions in the high pressure regions 230H and 231H and the low pressure regions 230L enables the same effects as those obtained in the first example embodiment described above to be obtained. In particular, the protrusions 232 enable the high pressure regions 230H and 231H created by the curves to be enlarged, which increases the degree of freedom of the arrangement of the inlets 234a, 236a, and 238a.

Figure 3C:
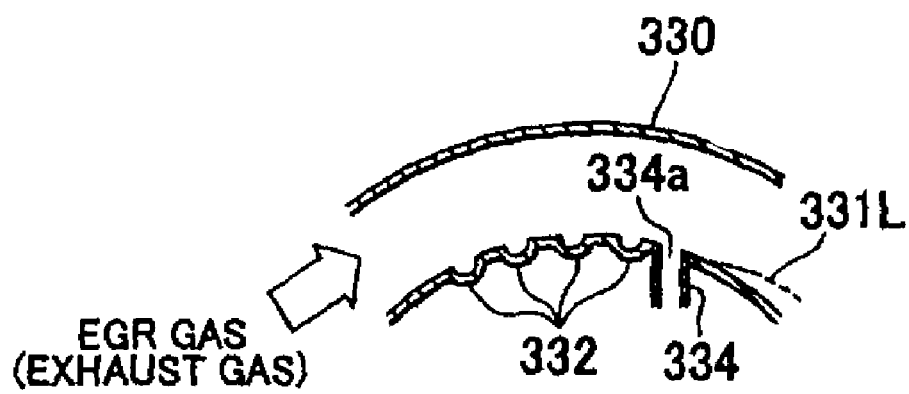

Moreover, as shown in FIG. 3C, grooves which are orthogonal to the direction of the exhaust gas flow or dispersed dimples 332 (which correspond to concave portions) may also be provided on the inside surface on the insides of the curves of an EGR pipe 330 that is curved like the EGR pipe 30 in the first example embodiment. This inhibits the exhaust gas flow from coming off of the inside surface of the EGR pipe 330, which reduces low pressure regions 331L. As a result, the same effects as those obtained in the first example embodiment described above can be obtained. In addition, even if the arrangement is such that the only place for an inlet 334a of a gas introduction passage 334 is that shown in the drawing, the low exhaust pressure can be adjusted by the dimples 332 so the degree of freedom of design can be improved.

Figure 4:
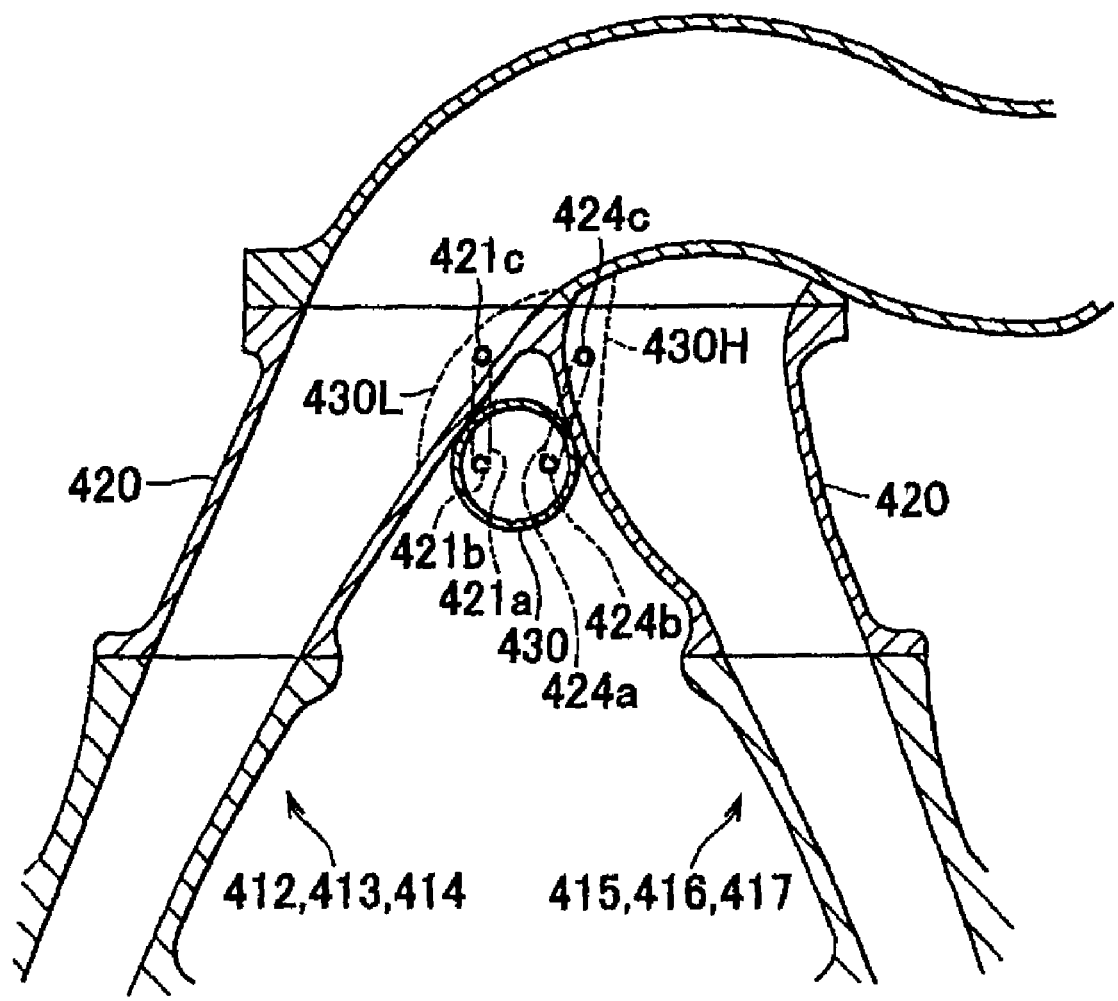
FIG. 4 is a longitudinal sectional view showing the general structure of an intake mixture introducing apparatus according to a third example embodiment of the invention.

Incidentally, combining FIGS. 3A, 3B, and 3C enables the difference in the pressures of the introduced exhaust gas among cylinders to be reduced further, as well as increases the degree of freedom in design. According to a third example embodiment of the invention, low pressure regions 430L and high pressure regions 430H of intake air that are created in intake paths 412 to 417 are combined, as shown in FIG. 4, with the structure in the first or second example embodiment described above.

That is, an intake pressure adjusting mechanism that uses curves is formed in the intake paths 412 to 417, such that the low pressure regions 430L and the high pressure regions 430H are created using the intake air flow. The low pressure regions 430L and the high pressure regions 430H enable the intake pressure at outlets 421c and 424c of gas introduction paths 421a and 424a to be adjusted.

Therefore, when the exhaust pressure difference at inlets 421b and 424b is unable to be sufficiently reduced by adjusting the exhaust pressure using the gas pressure adjusting mechanism (the first and second example embodiments) on the EGR pipe 430 side, assistance is provided by using the intake pressure difference at the outlets 421c and 424c of the gas introduction paths 421a and 424a on the intake pressure adjusting mechanism side. That is, the differential pressures between the exhaust pressures at the inlets 421b and 424b of the gas introduction paths 421a and 424a and the intake pressures at the outlets 421c and 424c are made the same so the same amount of exhaust gas is introduced into all of the branch pipes of an intake manifold 420, thereby enabling the same EGR rate to be obtained in all of the cylinders.

The third example embodiment described above yields the following effects. (I). In the third example embodiment, the gas pressure adjusting mechanism on the EGR pipe 430 side and the intake pressure adjusting mechanism on the intake path 412 to 417 side work together to adjust the amount of exhaust gas introduced into the intake paths 412 to 417. Therefore, in addition to obtaining the same effects as those obtained in the first or second example embodiment, even if the gas pressure adjusting mechanism on the EGR pipe 430 side is insufficient, the EGR rates are able to be made precisely the same with a high degree of freedom by adjusting the intake pressure.

Furthermore, in the example embodiments described above, exhaust gas is introduced into the intake path at a location in the intake manifold. However, if there is an intake path for each cylinder, exhaust gas may also be introduced by providing an outlet of the gas introduction passage at a portion where the intake path for each cylinder branches off inside the surge tank (i.e., at the branch path 18a in the first example embodiment). Also, exhaust gas may be introduced by providing an outlet of a gas introduction passage on the intake port side.

In the example embodiment described above, the gas that is introduced into the intake path is exhaust gas. Alternatively, however, other gas, such as blow by gas or purged fuel gas from a canister may also be introduced in the same manner into the intake path.

The direction of the inlets or outlets of the gas introduction passages affects the exhaust pressure or intake pressure. Therefore, the gas pressure adjusting mechanism also includes the direction of the inlets or outlets of the gas introduction passages. The exhaust pressure can be even more precisely adjusted by adjusting the arrangement and direction of the inlets or outlets of the gas introduction passages.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An intake mixture introducing apparatus that introduces gas from a common gas passage into intake paths independently provided for each cylinder of an internal combustion engine provided with a plurality of cylinders, via gas introduction passages independently provided for each intake path, comprising:
   a gas pressure adjusting mechanism that adjusts the pressure of gas introduced into the intake paths via the gas introduction passages and that is provided in the common gas passage in accordance with the positions where the gas introduction passages are arranged,
   wherein the gas pressure adjusting mechanism adjusts the pressure of the gas introduced into the intake paths by causing a change in the gas pressure at inlets of the gas introduction passages using gas flow inside the gas passage, said inlets being arranged at selected positions in view of the pressure distribution generated with the gas flow,
   wherein the gas pressure adjusting mechanism is provided for one or two or more of the gas introduction passages, and adjusts the pressure of the gas introduced into the intake paths such that a difference in the pressure of the gas introduced into the intake paths is reduced,
   wherein the gas pressure adjusting mechanism provides a curve in the gas passage and adjusts the gas pressure at the inlets using a pressure changing effect of the curve on the gas flow,
   wherein the gas pressure adjusting mechanism provides the curve by forming the gas passage in a serpentine shape,
   wherein a plurality of the gas pressure adjusting mechanisms which adjust the gas pressure to different levels are arranged in the direction of gas flow in the gas passage so as to adjust the gas pressure at the inlets, and
   wherein the gas pressure adjusting mechanisms are arranged so as to reduce the pressure farther upstream of the gas introduction passages and increase the pressure farther downstream of the gas introduction passages.

2. The intake mixture introducing apparatus according to claim 1, wherein the gas pressure adjusting mechanism provides one or both of a concave portion and a convex portion on an inside surface of the gas passage, and adjusts the gas pressure at the inlets using a pressure changing effect of one or both of the concave portion and the convex portion on the gas flow.

3. The intake mixture introducing apparatus according to claim 1, wherein the gas passage is an EGR passage.

4. The intake mixture introducing apparatus according to claim 3, wherein the gas pressure adjusting mechanism is set to bring EGR rates in the cylinders closer together.

5. The intake mixture introducing apparatus according to claim 3, wherein, the gas pressure adjusting mechanism is set to make EGR rates in the cylinders the same.

6. The intake mixture introducing apparatus according to claim 1, further comprising an intake pressure adjusting mechanism in the intake paths that adjusts an intake pressure at outlets of the gas introduction passages.

7. The intake mixture introducing apparatus according to claim 6, wherein the intake pressure adjusting mechanism causes a change in the intake pressure at the outlets of the gas introduction passages using intake air flow in the intake paths.

8. The intake mixture introducing apparatus according to claim 6, wherein the gas pressure adjusting mechanism and the intake pressure adjusting mechanism work together to adjust the amount of gas introduced into the intake paths from the gas passage via the gas introduction passages.

9. The intake mixture introducing apparatus according to claim 8, wherein the gas pressure adjusting mechanism and the intake pressure adjusting mechanism work together to reduce the difference in gas concentration in the cylinders.

10. The intake mixture introducing apparatus according to claim 8, wherein the gas pressure adjusting mechanism and the intake pressure adjusting mechanism work together to make the gas concentration in the cylinders the same.

11. An intake mixture introducing apparatus that introduces gas from a common gas passage into intake paths independently provided for each cylinder of an internal combustion engine provided with a plurality of cylinders, via a first gas introduction passage provided for a first intake path located at an upstream position of the gas passage and a second gas introduction passage provided for a second intake path located at a downstream position of the gas passage, the intake mixture introducing apparatus comprising:
   a first gas pressure adjusting mechanism that adjusts the pressure of gas at an inlet of the first gas introduction passage such that a difference in the pressure of the gas introduced into the first intake path is reduced, the first gas pressure adjusting mechanism being provided on the gas passage corresponding to the position of the first intake path; and
   a second gas pressure adjusting mechanism that adjusts the pressure of gas at an inlet of the second gas introduction passage such that a difference in the pressure of the gas introduced into the second intake path is reduced, the second gas pressure adjusting mechanism being provided on the gas passage corresponding to the position of the second intake path,
   wherein: the gas passage is provided with a curve formed by forming the gas passage in a serpentine shape and is such that the pressure of gas is reduced from an upstream side to a downstream side in a direction of gas flow;
   the first gas pressure adjusting mechanism adjusts the pressure of gas at the inlet of the first gas introduction passage using a pressure changing effect of the curve of the gas passage on the gas flow;
   the second gas pressure adjusting mechanism adjusts the pressure of gas at the inlet of the second gas introduction passage using the pressure changing effect of the curve of the gas passage on the gas flow;
   the inlet of the first gas introduction passage is provided at the upstream position in a low pressure region, in which the pressure of gas is lower than the pressure of the gas in a surrounding area due to the pressure changing effect; and
   the inlet of the second gas introduction passage is provided at the downstream position in a high pressure region, in which the pressure of the gas is higher than the pressure of the gas in a surrounding area due to the pressure changing effect.

* * * * *